United States Patent [19]
West

[11] Patent Number: 5,873,671
[45] Date of Patent: Feb. 23, 1999

[54] RAIL ATTACHMENT BRACKET WITH SNAP-ON COVER

[75] Inventor: Ron West, Provo, Utah

[73] Assignee: Kroy Building Products, Inc., York, Nebr.

[21] Appl. No.: 802,129

[22] Filed: Feb. 19, 1997

[51] Int. Cl.⁶ ..................................................... E04F 11/18
[52] U.S. Cl. ........................... 403/232.1; 256/65; 256/59
[58] Field of Search .................................. 256/19, 66, 65, 256/59; 403/232.1

[56] References Cited

U.S. PATENT DOCUMENTS

| | | | |
|---|---|---|---|
| 3,107,900 | 10/1963 | DePaolo | 256/65 |
| 3,278,149 | 10/1966 | Brucker | 403/232.1 X |
| 4,101,226 | 7/1978 | Parisien | 256/65 X |
| 4,616,950 | 10/1986 | Morris | 256/65 X |
| 5,143,472 | 9/1992 | Reed et al. | 256/59 X |
| 5,437,433 | 8/1995 | Rezek | 256/59 X |
| 5,441,241 | 8/1995 | McKim | 256/65 |

FOREIGN PATENT DOCUMENTS 3404947  8/1985  Germany ................................. 256/65

*Primary Examiner*—Anthony Knight
*Attorney, Agent, or Firm*—Thorpe, North, Western, L.L.P.

[57] ABSTRACT

An attachment system for connecting a hollow rail to a support post includes an attachment bracket with a face plate for attachment to the support post, and a distally extending internal support member for nesting within the end of the rail. To enable disposition of the rail in an orientation other than orthogonal to the face plate, a portion of the internal support member is rounded to tapered, to provide the rail with up to forty-five degree movement from the orthogonal position. The attachment system also includes a snap-on cover which connects to the attachment bracket to cover the attachment bracket and provide a more aesthetically pleasing appearance to the attachment point between the support post and the rail.

20 Claims, 5 Drawing Sheets ns that the rail 22 will become detached from the support post is significant. Additionally, a large, unsightly gap 26a can be left between the molding 14 and the rail 22.

RAIL ATTACHMENT BRACKET WITH SNAP-ON COVER

BACKGROUND OF THE INVENTION

1. Field of the Invention

The present invention relates to a rail attachment bracket which is used to secure a rail to a support post. More particularly, the present invention relates to a rail attachment bracket and snap-on cover which provides improved support for hollow rails when they are attached to support posts, and which enables the screws and other portions of the attachment bracket to be hidden from view.

2. State of the art

There are numerous types of fences and railings which are used to designate boundaries. Fences may be used on property lines, or to protect individuals from dangerous locations. Additionally, railings on stair cases and decks help to steady people and prevent accidental injury. For centuries, the primary building materials for such fences and railings were primarily metal and wood.

Recently, there has been a tremendous increase in the use of vinyl and similar products for such purposes. The vinyl products have numerous advantages over the prior materials. Namely, the vinyl is flexible and less prone to damage than wood and other prior materials. The vinyl is also mark resistant and does not require frequent repainting or staining to protect the fence or railing from the elements. Additionally, the vinyl products are usually cost competitive with the other materials. Because of these advantages, vinyl has become a material of choice for making fences, columns, and railings for decks and staircases.

While the vinyl products are highly desirable for such uses, the fact that the vinyl is typically formed into hollow rails or posts raises certain difficulties. Primarily, the lack of any center support makes vinyl rails and posts more difficult to attach to support structures, especially to other pieces of vinyl.

To accomplish attachment of a vinyl rail to a support member, the prior art has typically relied on indirect attachment. Referring to FIG. 1, there is shown a cross-sectional view of the attachment mechanism which is typically used for the rails of vinyl fences and vinyl railings on decks and the like. The support post 10 as a piece of molding 14 which is attached thereto by a pair of screws 18. The rail 22 is nested into an opening 26 in the molding 14 so that the molding forms a bracket to hold the rail in place. If desired, additional screws 28 can be used to physically attach the molding 14 to the end 22a of the rail 22.

Unfortunately, such a configuration has several disadvantages. First, there is no support within the rail 22 to provide the end 22a thereof with support. If the end 22a of the rail 22 is impacted, it may brake due to the lack of flexibility caused by the molding. If the rail 22 is bent sufficiently at a point inwardly from the end 22a, the end can be pulled out of the opening 26. To reattached the rail 22, the rail must either be rebent and slid into the opening (often a difficult task), or the molding must be unscrewed from the support post 10, slid over the end of the rail 22, and then reattached to the support post.

Another disadvantage of the prior art configuration shown in FIG. 1 is that the screws 18 which hold the molding 14 to the support post 10, and any screws 28 holding the molding to the rail 22 are plainly visible. The visible screws are generally less aesthetically pleasing than a finished product where no screws or nails are visible. Due to the number of screws 18 which may be visible, the screws can make the vinyl appear to be of lower craftsmanship than comparable wood products where the screw heads are covered.

Still another disadvantage of the prior art configuration shown in FIG. 1 is that the molding 14 provides inferior support for situations wherein the rail 22 is not disposed in a perpendicular arrangement with the support post 10. When the rail 22 is disposed at an angle such as 35 or 45 degrees, the rail no longer nests conveniently within the opening 26 of the molding 14. While the molding 14 may be cut away to enable insertion of the rail 22, the molding then provides very little vertical support for the rail, as shown in FIG. 1A. Thus, the risk that the rail 22 will become detached from the support post is significant. Additionally, a large, unsightly gap 26a can be left between the molding 14 and the rail 22.

Thus, there is a need for an improved rail attachment bracket wherein the bracket provides improved support to better hold the rail to the support post. Such an improved rail attachment bracket should be designed to work well in situations in which the rails attached to the support posts are disposed transverse to a plane perpendicular to the support post, i.e. in a position not orthogonal to the support post. The attachment bracket should also be inexpensive and easy to use. Additionally, the bracket should be coverable to provide a finished look to the final vinyl or composite railing, etc.

OBJECTS AND SUMMARY OF THE INVENTION

Thus, it is an object of the present invention to provide an improved rail attachment bracket which provides a more secure connection between a support post and a rail attached thereto, and which permits the rail to be securely held while the rail extends upwardly, downwardly or in any other orientation from the support post.

It is another object of the present invention to provide such an attachment bracket which can readily be concealed, and which enables concealment of the screws which are used to secure the attachment bracket to the support post.

It is yet another object of the present invention to provide such an attachment bracket which is configured for toolless attachment to a cover molding for covering the bracket and for providing a finished end piece for the rail.

It is still another object of the present invention to provide such a bracket and cover which are compatible with a rail disposed at a plurality of angles relative to the support post.

It is still yet another object of the present invention to provide such a bracket and cover which are relatively inexpensive and easy to use.

The above and other objects of the invention are realized in specific illustrated embodiments of a rail attachment bracket including a face plate for disposition against a support post such that screws or other anchors inserted through the face plate hold the bracket to a support post. Extending from the face plate is an internal support member which is configured to extend into a hollow end portion of the rail and provide support to the rail regardless of the rail's orientation with respect to the support post.

In accordance with one aspect of the invention, the internal support member extending from the face plate has a distal end having a rounded or otherwise beveled portion positioned along one side thereof. The rounded portion is configured to enable the rail to be disposed at up to a forty-five degree angle relative to the support post while the internal support member provides internal support to the rail. When the rounded/tapered position is disposed at the bottom of the internal support member, a rail is able to extend upwardly at a forty-five degree angle while the internal support member remains nested inside the end of the rail and provides sufficient support. In the alternative, the rounded portion of the internal support member may be positioned at the top of the internal support member, thereby enabling a rail to slope downwardly from the support post at an angle up to 45 degrees while the internal support member is nested therein and providing both vertical and lateral support to the rail.

In accordance with another aspect of the present invention, the attachment bracket is provided with a plurality of slots. The slots are typically formed in the face plate. A cover having deformable tabs, the ends of which are barb-shaped and configured to lockingly nest within the slots is also provided. The cover is shaped to cover the end of the rail and to cover the face plate of the bracket. Forcing the cover toward the face plate causes the tabs of the cover to nest in the slots, thereby providing a "snap-on" molding which conceals the screws or other anchors holding the face plate to the support post. Thus, the cover provides a more finished look while the bracket provides improved support for attachment of the rail to the support post. Additionally, the rail is disposed in a channel formed between the internal support member and the cover, thereby providing additional support. If desired, the rail can be physically attached to the internal support member for additional strength.

In accordance with another aspect of the present invention, the cover and the slots are configured to facilitate relative movement between the cover and the rail. The ability to move the cover relative to the rail enables the user to cover the bracket in such a manner that there are no large, noticeable gaps between the rail and the molding, such as that shown in FIG. 1A at 26a. Additionally, the interior of the cover can be configured to receive the opposing sides of the rail, even thought the long side extends considerably after engagement with the molding.

In accordance with another aspect of the present invention, a semi-resilient bonding agent, such as silicone glue, is used to attach the rail to the attachment bracket. The semi-resilient bonding agent holds the rail to the internal support member, etc., of the bracket, while also allowing for minor expansion and contraction of the internal support member and rail due to changes in temperature and other environmental conditions.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 2:
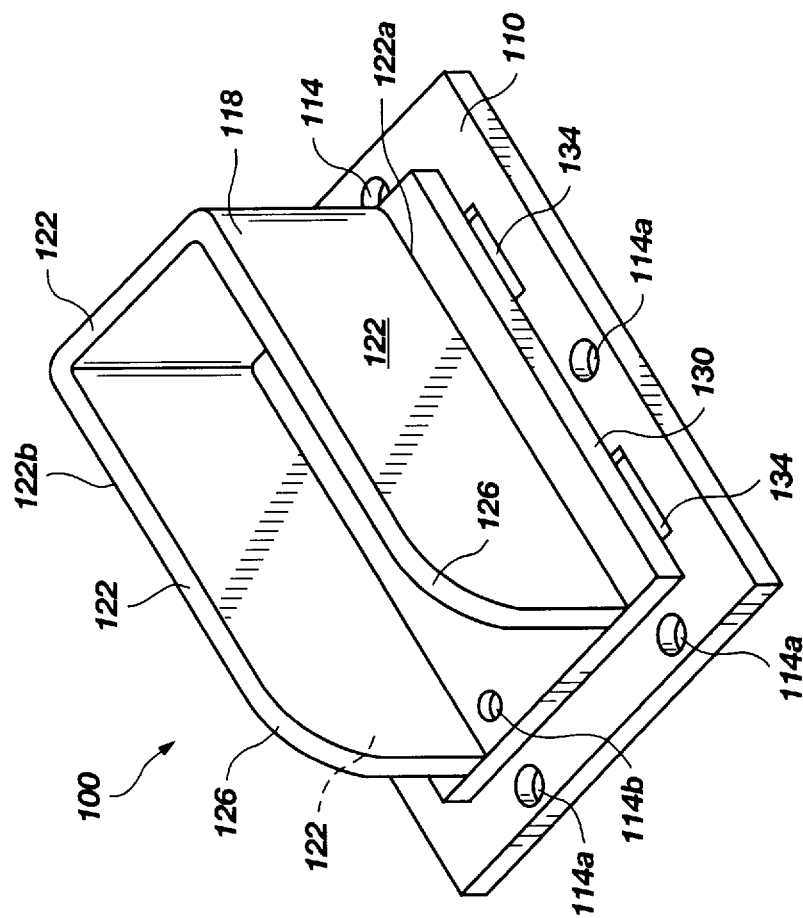
FIG. 2 shows a perspective view of an attachment bracket made in accordance with the principles of the present invention.

Referring to FIG. 2, there is shown a perspective view of an attachment bracket, generally indicated at 100, made in accordance with the principles of the present invention. The attachment bracket 100 includes a face plate 110 having a plurality of holes 114 formed therein to facilitate attachment of the attachment bracket to a support post. The holes 114 may be formed adjacent the periphery of the face plate 110, as indicated at 114a, or may be disposed in the interior, as indicated at 114b, where the holes will be covered by a rail disposed adjacent to the face plate.

Extending generally orthogonally from the face plate 110 is an internal support member 118 which is configured to nest within a rail (not shown in FIG. 2). The internal support member 118 can be formed of a solid piece of composite. However, to save on the cost of material and to facilitate more rapid molding of the attachment member 100, the internal support member 118 is preferably formed by a plurality of sidewalls 122. The sidewalls 122 of the internal support member 118 have a proximal end 122a adjacent the face plate 118, and a distal end 122b disposed opposite the face plate. The sidewalls 122 are configured with a rounded or tapered portion 126 on one side of the internal support member 118. The rounded/tapered portion slopes toward the face plate. As will be discussed in detail with respect to FIGS. 2B and 4B, the rounded/tapered portion enables a rail to be attached to a support rail at an angle other than orthogonal to the face plate while the internal support member 118 is disposed within the rail, thereby supporting the rail but not interfering with the rail's position. Rounded portion 126 may be open, or may be closed with a sidewall as indicated by the dashed lines and the dashed numeral 122.

Disposed at the bottom of the sidewalls 122 is a ridge 130 which is disposed adjacent to the face plate 110. The ridge 130 is designed to have a perimeter which generally aligns with the perimeter of a rail amounted over the internal support member 118. The ridge 130 also forms a retaining flange which partially covers slots 134 formed in the face plate 110. As will be discussed in additional detail with respect to FIGS. 3 through 3B, the slots 134 enable a snap-on cover to be connected to the attachment bracket 100 and to cover the face plate 110 and conceal the screws, etc., used to mount the face plate to the support post.

It should be noted in FIG. 2 that the slots 134 formed in the face plate 110 are relatively long. The length of the slots 134 enables the cover to slide relative to the face plate 110 once the cover has been attached. This enables the person assembling the railing, etc., to slide the cover into the proper position to provide the most finished look possible on portions of the rail which are most visible.

Figure 2A:
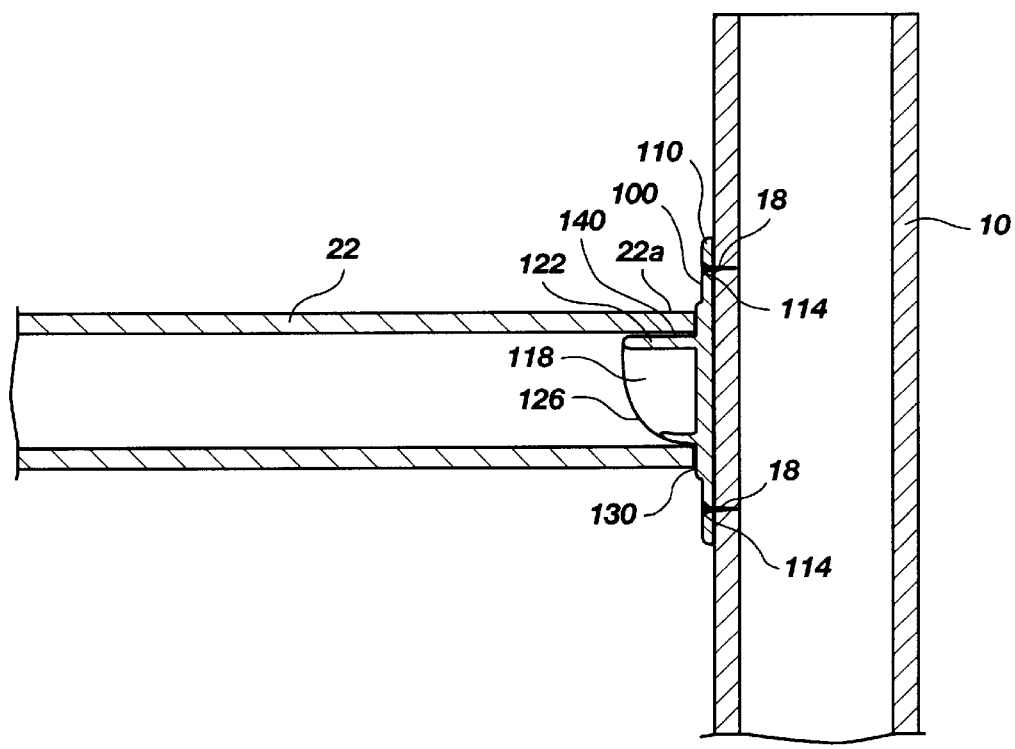
FIG. 2A shows a side, cross-sectional view of the attachment bracket of FIG. 2 mounted on a support post, the internal support member of the attachment bracket being disposed within the end of the rail.

Turning now to FIG. 2A, there is shown a cross-sectional view of a rail 22 attached to a support post 10 by an attachment bracket 100 in accordance with the principles of the present invention. The face plate 110 of the attachment bracket 100 is attached to the support post 10 by a plurality of screws 18. The internal support member 118 extends outwardly (distally) from the face plate 110 and is configured so that its sidewalls 122 nest within the proximal end 22a of the rail 22. The rail 22 is advanced until is rests against the ridge 130 at the base of the sidewalls 122.

The internal support member 122 provides a significant amount of support to the proximal end 22a of the rail 22. To prevent the rail 22 from separating from the internal support member 118, the rail can be attached to the internal support member with a screw or other anchor. However, it has been found that a preferable mechanism for attachment is the use of a bonding agent such as a silicone glue 140. While the silicone glue 140 prevents the rail 22 from being pulled off the internal support member 118, it is sufficiently resilient to enable the rail to expand and contract slightly without cracking or other damage to the composite material. Thus, the rail 22 is able to withstand seasonal temperature changes for many years with virtually no damage.

Figure 2B:
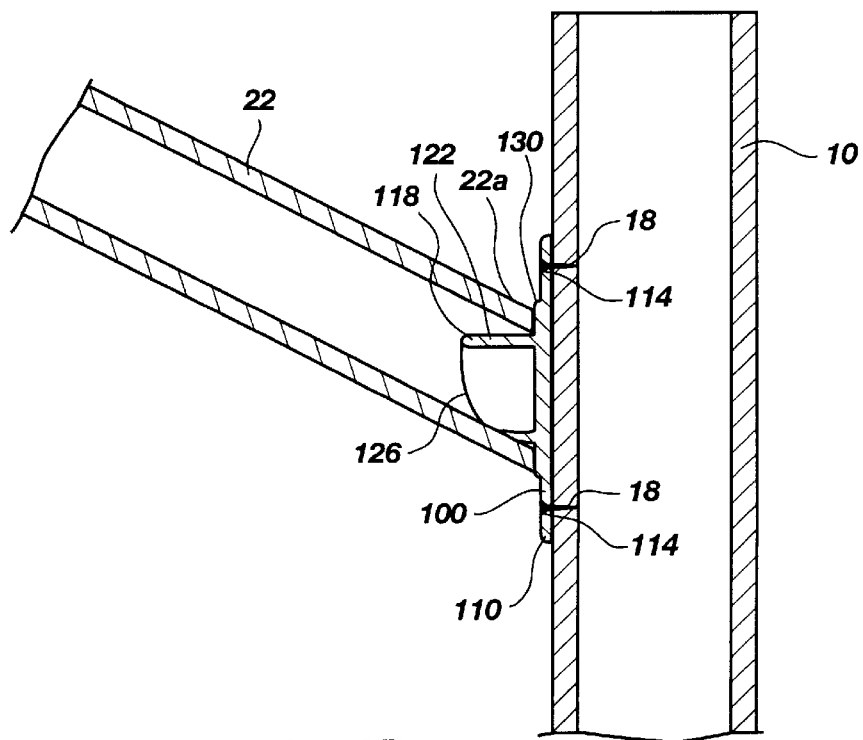
FIG. 2B shows a side cross-sectional view similar to that of FIG. 2A, but with the rail extending upwardly from the support post and attachment bracket.

Turning now to FIG. 2B, there is shown the use of the attachment bracket 100 with a rail 22 which is disposed at an angle other than orthogonal to the face plate 110 and support post 10. The attachment bracket 100 is attached in the same manner as set forth above with respect to FIG. 2A, and is therefore numbered accordingly. Rather than the rail 22 being disposed generally horizontally, however, the rail is disposed at an upward incline of about 30 degrees. While a square or rectangular internal support member 118 would normal prevent such a disposition of the rail 22, the rounded portion 126 of the internal support member enables the rail 22 to be disposed at up to a forty-five degree angle before the internal support member begins to interfere with the position of the rail. The internal support member 118 provides support against vertical movement, and two of the sidewalls (not shown in FIG. 2B) are readily available to attachment to the end 22a of the rail 22 by screws or by a semi-resilient adhesive such a silicone glue if desired.

While the attachment bracket 100 shown in FIGS. 2 through 2B is a significant improvement in attachment of the rail 22 to the support post 10, the face plate 110 and the screws 18 are still exposed. Thus, FIG. 3 shows a perspective view of a cover, generally indicated at 150, made in accordance with the principles of the present invention. The cover 150 includes an exterior wall 154 which extends proximally (downwardly in FIG. 3) and outwardly from an opening 158 defined by the exterior wall. The opening 158 is configured to receive the proximal end 22a of a rail 22 and cover the attachment thereof to the support post.

Disposed inside of the cover 150 are a pair of ribs 160, only one of which is shown in FIG. 3. The ribs 160 are disposed substantially in parallel and positioned to be immediately adjacent to the sides of the rail when the rail is disposed in the opening. Disposed adjacent the bottom 160a of each of the ribs 160 are a pair of tabs 164. The tabs 164 are configured with barb-shaped ends 164a which are deflected outwardly when the barb-shaped ends are disposed in contact with the sides of the rail 22. Once the rail is positioned on the internal support member 118 as shown in FIG. 2, the cover 150 is pushed toward the attachment bracket 100. Once the barbs pass the ridge 130 at the base of the sidewalls 122, the barb-shaped ends 164a pass into the slots 134 formed in the face plate 110. As the barbs 164 are no longer biased outward, they are able to move inwardly beneath the ridge 130, and thereby hold the cover 150 onto the attachment plate 100.

Figure 3A:
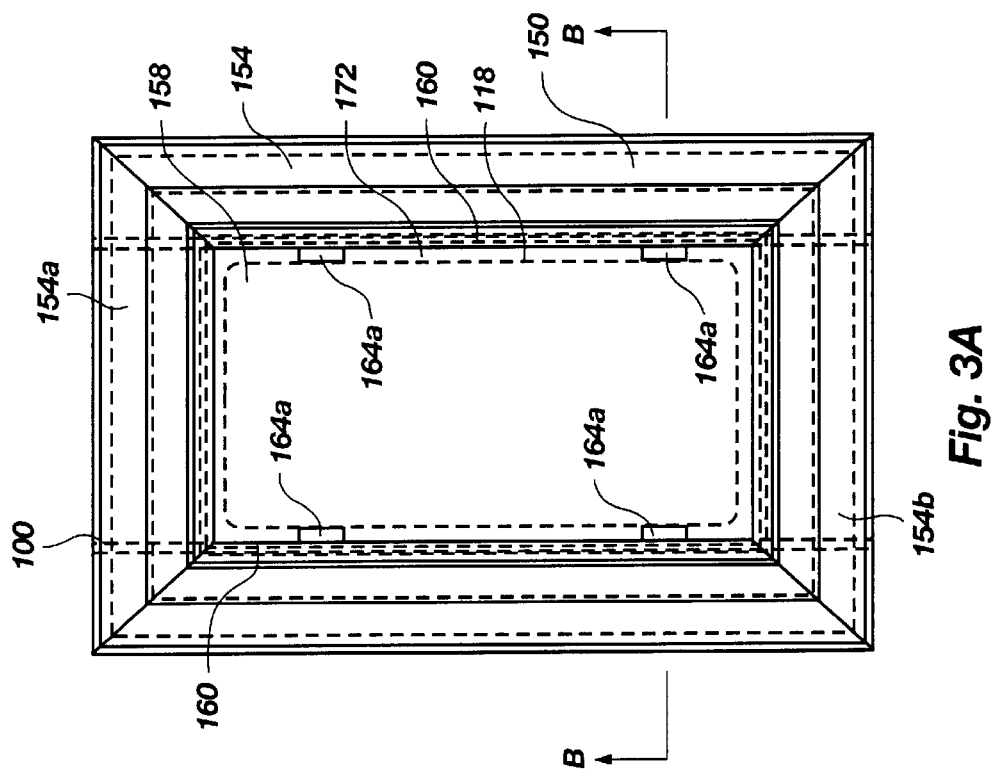
FIG. 3A shows a top view of the cover shown in FIG. 3 so as to reveal the containment area within the cover and the tabs used to secure the cover to the attachment bracket.
Figure 3:
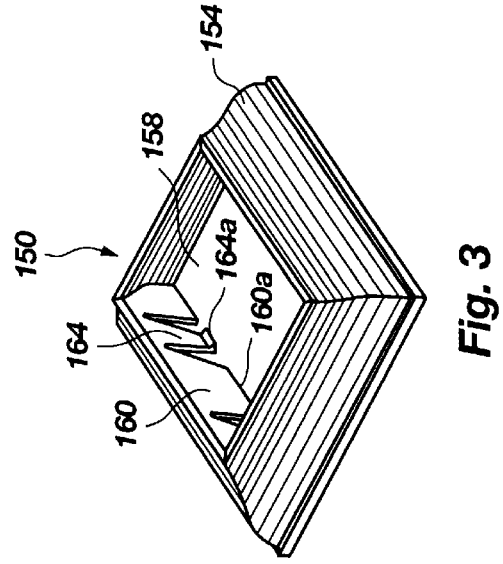
FIG. 3 shows a perspective view of a cover made in accordance with the principles of the present invention.

Referring now to FIG. 3A, there is shown a top view of the cover 150 shown in FIG. 3. The cover 150 includes the exterior wall 154 circumscribing the opening 158. The ribs 160 are disposed in parallel and are disposed to remain adjacent to the sides of a rail disposed therein. The ribs 160 and the top and bottom portions 154a and 154b of the exterior wall 154 thus define a containment area within the cover.

Additionally, the internal support member 118 of the attachment bracket 100 is preferably disposed in lateral alignment with the opening 158. Then the cover 150 is attached to the attachment bracket 100, a channel 172 is formed between the internal support member 118 and the ribs 160 laterally, and between the internal support member and the exterior wall 154 on the top and bottom. Thus, the end 22a of a rail disposed on the internal support member 118 is sandwiched between the ribs 160 and the sidewalls 122 of the internal support member 118, thereby providing additional support.

As is shown in FIG. 3A, the ribs 160 extend beyond the opening, and do not extend parallel to top or bottom portions 154a and 154b of the exterior wall. Because no rib 160 is present adjacent to top or bottom portions 154a and 154b, a rail which is disposed at an upwardly or downwardly sloping angle relevant to a support post is able to extend up into the upper portion 154a or down into the lower portion 154b of the exterior wall 154 without interference from an internal wall or other structure.

Also shown in FIG. 3A are the barb-shaped ends 164 of the tabs 160 which are configured for nesting in the slots 134 in the face plate 110. The barb-shaped ends 164 have a much smaller length than do the slots 134. Thus, when the barb-shaped ends 164 are disposed within the slots, the cover 150 can be moved vertically, either up or down, depending on the position of the barb-shaped ends within the slots. By enabling sliding movement of the cover 150, the user can move the cover upwardly or downwardly, thereby changing the position of the opening 158 with respect to a rail. Thus, the cover 150 can be moved to provide the best fit with the rail and thereby minimize any gaps between the rail and the cover, and to position any gaps on the underside of the rail where it will be much less visible.

Figure 3B:
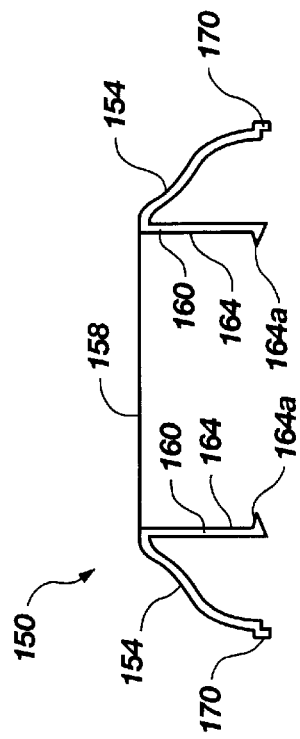
FIG. 3B shows a cross-sectional view of the cover shown in FIGS. 3 and 3A taken through one pair of tabs.

Turning now to FIG. 3B, there is shown a cross-sectional view of the cover 150 of FIG. 3, taken along the line B—B. The cross-sectional view of FIG. 3B shows the exterior wall 154, the opening 158, the ribs 160 and the barb-shaped ends 164a of the tabs 160. Also shown is a small flange 170 disposed at the base of each portion of the exterior wall 154. The flange 170 is configured to nest about the perimeter of the face plate 110 of the attachment bracket 100, to thereby cover the face plate and conceal the screws or other anchoring devices used to hold the attachment bracket to a support post, etc.

Figure 4A:
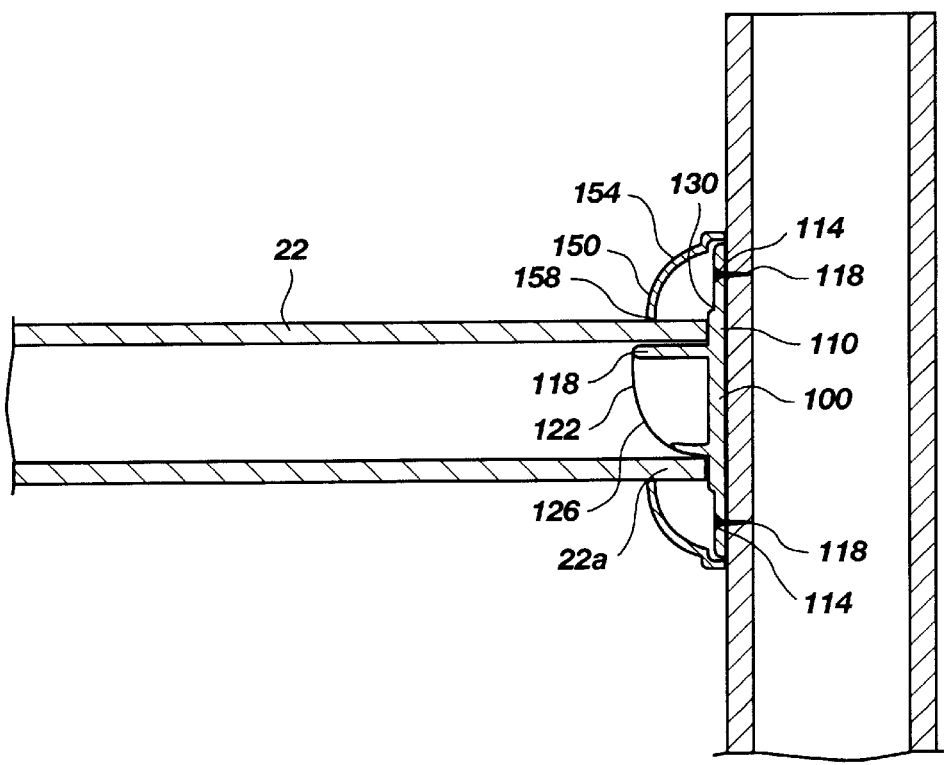
FIG. 4A shows a cross-sectional view similar to that of FIG. 2A with a cover made in accordance with the principles of the present invention disposed over the end of the rail and the attachment bracket.

Turning now to FIG. 4A, there is shown a cross-sectional view of a support post 10 and a rail 22. An attachment bracket 100 made in accordance with the principles of the present invention is attached to the support post 10 in substantially the same manner as described with respect to FIG. 2A. The primary difference between FIG. 2A and FIG. 4A is that a cover 150 is disposed about the end 22a of the rail 22 and abuts the support post 10. In such a position, the cover 150 conceals the face plate, the screws and the remaining aspects of the attachment bracket 100. The cover 150 also provides a tight fitting and finished look to the end of the rail.

In order to achieve the advantageous configuration of FIG. 4A, the user will typically cut the rail approximately one-eighth of an inch shorter than the distance between opposing ridges 130 on attachment brackets 100 on opposing support posts 10. The attachment bracket 100 is then slid into the end 22a of the rail 22, and another attachment bracket is disposed in the opposing end of the rail. The rail 22 is then positioned between two support posts 10 (only one of which is shown) and the attachment brackets 100 are attached to the support posts. While the rail 22 is one-eighth of an inch short of a perfect fit, the rail can be attached to the internal support member 118 by silicone glue, etc. However, because the internal support member 118 extends into the rail a considerable distance more the one-eighth of an inch, the fastening of the rail to the internal support member 118 is not necessary.

Figure 1:
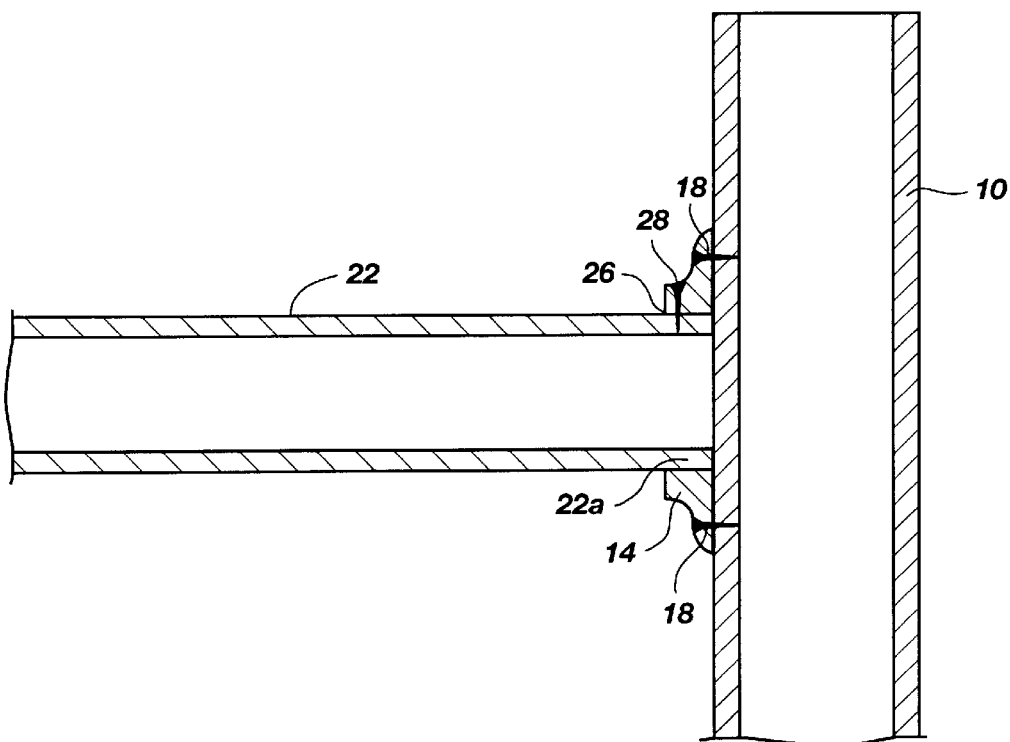
FIG. 1 shows a composite rail connected to a support post by a piece of molding in accordance with the teachings of the prior art.
Figure 1A:
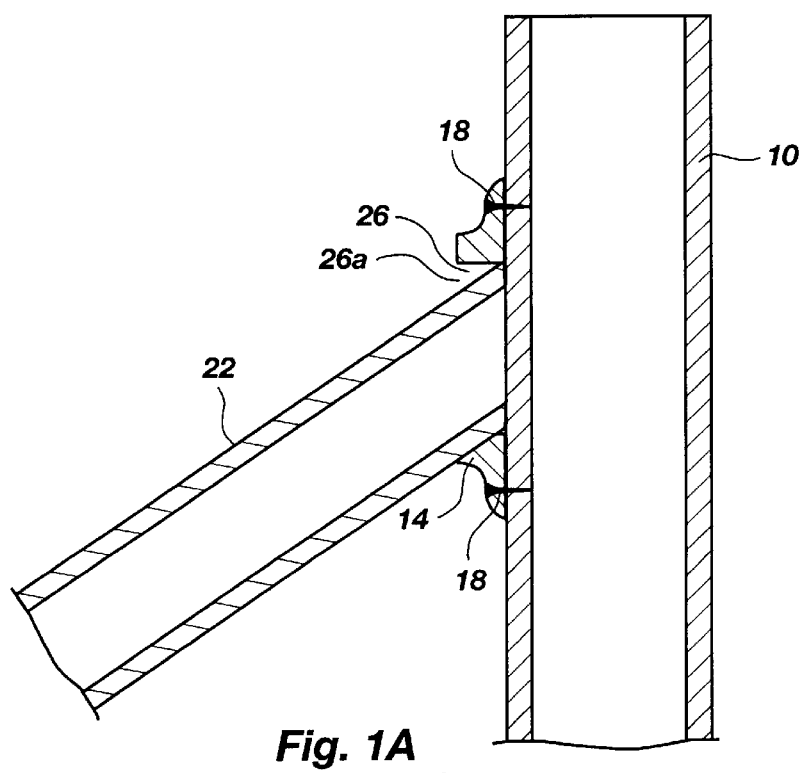
FIG. 1A shows a composite rail connected to a support post at an angle in accordance with the teachings of the prior art.
Figure 4B:
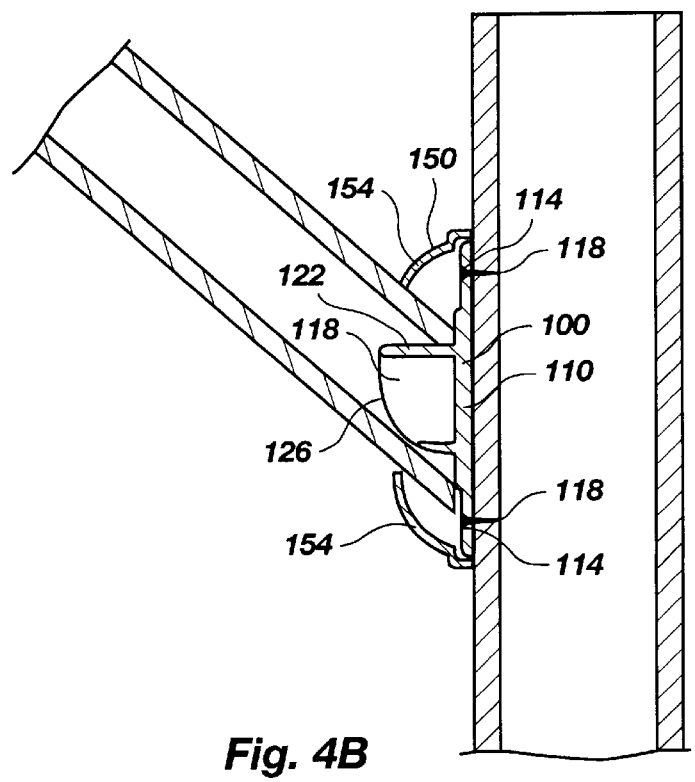
FIG. 4B shows a cross-sectional view similar to that of FIG. 2B with a cover disposed over the end of the rail and the attachment bracket in accordance with the teachings of the present invention.

Turning now to FIG. 4B, there is shown a cross-sectional view similar to that of FIG. 2B, but with a cover 150 disposed over the end 22a of the rail 22. Due to the rounded portion 126 of the internal support member 118, the rail 22 can be disposed at any angle up to forty-five degrees from an orthogonal plane perpendicular to the support post 10. Disposing the rail 22 in such a position, however, raises several problems. With respect to the cover 150 or other molding (as shown in FIG. 1A), the angle of the rail 22 can leave a large gap between the molding and the rail, as shown in FIG. 1A at 26a.

The present invention, however, overcomes this problem in two ways. First, as was mentioned above, the snap-on cover 150 is slidable with respect to the attachment bracket 100 because of the large slots 134 in the face plate 110, and the short barb-shaped ends 164a on the tabs extending from the ribs 160. Second, either of the end portions 154a and 154b of the exterior wall 154 of the cover 150 can be partially or completely cut away. Thus, disposition of the rail 22 at a significant angles does not prevent the end 22a of the rail from sliding into the opening 158 in the cover. Typically, the portion of the cover 150 which is cut away will be disposed on the bottom of the rail, as this position is much less noticeable under most conditions. At the same time, the cover 150 tightly fits the top of the rail 22 where it is likely to be seen.

By using the attachment bracket 100 and the snap-on cover 150, a stronger and aesthetically more pleasing finish can be provided to porch railings, stairways and the like. The railing is more secure than with past attachment methods, and the has a better appearance.

While discussed with respect to a rail being attached to extend upwardly or downwardly from a support post, in light of the present disclosure, those skilled in the art will appreciate that the invention can also be used with rails that extend horizontally from the support post, but at some angle forward or rearward. Thus, for example, a vinyl fence would be formed with by a plurality of horizontally disposed rails extending from their support posts to form a gradual circle.

Thus there is disclosed an improved rail attachment bracket and a snap-on cover. Those skilled in the art will appreciate numerous modifications which can be made without departing from the scope and spirit of the present invention. The appended claims are intended to cover such modifications.

What is claimed is:

1. An attachment bracket for connecting a composite rail having a hollow, open end to a support post, the attachment bracket comprising:

a face plate for disposition against and attachment to the support post, the face plate having at least one slot formed therein, said slot being configured for receiving a tab of a snap-on connector;

means for attaching the face plate to the support post; and an internal support means extending outwardly from the face plate, the internal support means being configured for nesting within an opening in the composite rail, the internal support means having distal end disposed opposite the face plate, and having a rounded/tapered portion along the distal end wherein the distal end slopes toward the face plate for facilitating disposition of a rail at an angle other than orthogonal from the face plate.

2. The attachment bracket of claim 1, wherein the internal support member comprises a plurality of sidewalls extending from the face plate and attached to each other so as to form a hollow between the sidewalls and the face plate.

3. The attachment bracket of claim 2, wherein the support walls form a generally rectangular extension from the face plate.

4. The attachment bracket of claim 1, wherein the internal support member comprises a plurality of sidewalls extending outwardly from the face plate, and wherein a ridge is disposed about sidewalls adjacent the face plate, the ridge partially overlapping the at least one slot.

5. An attachment system for holding an end of a rail to a support post including the attachment bracket of claim 1, and further comprising:

cover means having an exterior wall defining an opening, the opening being configured to receive the end of a rail therein, and means for attaching the cover means to the attachment bracket.

6. The attachment system of claim 5, wherein the exterior wall of the cover means extends outwardly and proximally from the opening so as to substantially cover the face plate of the attachment bracket when the cover means is attached to the attachment bracket.

7. The attachment system of claim 5, wherein the means for attaching the cover means to the attachment bracket comprises at least one tab slidably engageable with the at least one slot of the face plate to thereby form a snap-on fitting between the cover means and the attachment bracket.

8. The attachment system of claim 7, wherein the face plate has a plurality of slots formed therein, and wherein means for attaching the cover means to the attachment bracket comprises a plurality of tabs having barb-shaped ends which are slidable into a locking engagement in the slots of the face plate.

9. The attachment system of claim 7, wherein the at least one tab has a length, and wherein the at least one slot in the face plate has a length which is greater than the length of the at least one tab to thereby enable sliding of the at least one tab within the slot, to thereby enable sliding of the cover means with respect to the attachment bracket.

10. An attachment bracket for connecting a composite rail having a hollow, open end to a support post, the attachment bracket comprising:

a face plate for disposition against and attachment to the support post, the face plate having at least one slot formed therein, said slot being configured for receiving a tab of a snap-on connector;

means for attaching the face plate to the support post; and an internal support means extending outwardly from the face plate, the internal support means being configured for nesting within an opening in the composite rail, the internal support means having distal end disposed opposite the face plate, and having a rounded/tapered portion along the distal end wherein the distal end slopes toward the face plate for facilitating disposition of a rail at an angle other than orthogonal from the face plate;

cover means having an exterior wall defining an opening, the opening being configured to receive the end of a rail therein and means for attaching the cover means to the attachment bracket; and wherein the cover means further comprises a plurality of ribs attached to the exterior wall adjacent to the opening, the ribs extending in a generally parallel configuration to form a containment area therebetween, the containment area being disposed in alignment with the opening.

11. The attachment system of claim 10, wherein the at least one tab comprises a plurality of tabs having barb-shaped ends, and wherein the tabs are attached to the ribs.

12. The attachment system of claim 11, where a ridge is disposed adjacent the slots in the face plate, the ridge partially covering the slots, and wherein the barb-shaped tabs are deformable away from the ridge as the barb-shaped tabs pass over the ridge, and biased to slide under the ridge and thereby secure the cover means to the attachment bracket once the barb-shaped tabs are disposed in the slots in the face plate.

13. The attachment system of claim 10, wherein the exterior wall of the cover means has a top portion and a bottom portion, the top and bottom portion being configured such that one of the top or bottom portion is disposed adjacent the rounded/tapered portion of the internal support member when the cover means is attached to the attachment bracket, and wherein the top and bottom portions are characterized by the absence of ribs and other obstructions between the containment area and the exterior wall.

14. The attachment system of claim 13, wherein the top and bottom portions are formed from thin pieces of composite material to facilitate cutting away of the top or bottom portion if desired.

15. The attachment system of claim 10, wherein a channel is formed between the cover means and the internal support member when the cover means is attached to the attachment bracket, the channel being configured for receiving the end of a composite rail.

16. An attachment system for securing an end of a hollow rail to a support post while maintaining at least a majority of the attachment mechanism from view, the system comprising:

an attachment bracket configured for attachment to a support rail, the attachment bracket including:
a face plate having a plurality of holes formed therein for extending an anchoring mechanism through the plurality of holes to thereby secure the face plate; and
an internal support member extending outwardly from the face plate, the internal support member being configured for nesting in the end of the hollow rail and for providing support thereto;

cover means having an exterior wall defining an opening, the opening being configured for disposition about the end of the hollow rail, the exterior wall extending outwardly and proximally from the opening so as to substantially cover the face plate when the cover means is attached to the attachment bracket; and attachment means formed in the attachment bracket and the cover means for providing toolless attachment between the attachment bracket and the cover means.

17. The attachment system of claim 16, wherein the internal support member and the opening in the cover means are disposable in general alignment when the cover means is attached to the attachment bracket, to thereby form a channel between the exterior wall of the cover means and the internal support member when the cover means is attached to the attachment bracket.

18. The attachment system of claim 16, wherein the attachment means comprises a plurality of slots and a plurality of tabs slidable into a nesting arrangement within the slots to thereby provide a snap-on connection between the cover means and the attachment bracket.

19. The attachment system of claim 18, wherein the slots are formed in the face plate, and wherein a pair of ribs are attached to the exterior wall of the cover means, each of the ribs having at least one tab attached thereto.

20. The attachment system of claim 16, wherein the internal support member has a distal end, and wherein at least a portion of the distal end is rounded/tapered toward the face plate so as to enable movement of a rail supported by the attachment bracket into a nonorthogonal position relative to the face plate.

\* \* \* \* \*